United States Patent [19]

Hanai et al.

[11] Patent Number: 4,711,819
[45] Date of Patent: Dec. 8, 1987

[54] MAGNETIC RECORDING MEDIUM

[75] Inventors: Kazuko Hanai; Yasuyuki Yamada, both of Odawara, Japan

[73] Assignee: Fuji Photo Film Co., Ltd., Kanagawa, Japan

[21] Appl. No.: 786,179

[22] Filed: Oct. 10, 1985

Related U.S. Application Data

[63] Continuation of Ser. No. 592,981, Mar. 23, 1984, abandoned.

[30] Foreign Application Priority Data

Apr. 19, 1983 [JP] Japan ................................. 58-67856

[51] Int. Cl.$^4$ ............................................. G11B 5/702
[52] U.S. Cl. ........................... 428/425.9; 252/62.54; 427/128; 427/130; 428/522; 428/694; 428/900
[58] Field of Search .............. 428/425.9, 694, 900, 428/522; 360/135; 427/128, 130; 252/62.54

[56] References Cited

U.S. PATENT DOCUMENTS

| | | | |
|---|---|---|---|
| 3,804,810 | 4/1974 | Fryd | 428/425.9 |
| 4,154,895 | 5/1979 | Ogawa | 428/425.9 |
| 4,284,750 | 8/1981 | Amirsakis | 427/132 |
| 4,388,376 | 6/1983 | Kubota | 360/135 |
| 4,409,291 | 10/1983 | Ogawa | 428/900 |
| 4,420,601 | 12/1983 | Kuroda | 428/900 |
| 4,444,838 | 4/1984 | Yamada | 428/336 |
| 4,510,203 | 4/1985 | Ogawa | 428/900 |
| 4,568,613 | 2/1986 | Saito | 428/694 |
| 4,587,170 | 5/1986 | Hanai | 428/900 |

Primary Examiner—Ellis P. Robinson
Attorney, Agent, or Firm—Armstrong, Nikaido, Marmelstein & Kubovcik

[57] ABSTRACT

In a magnetic recording medium such as video tape, audio tape and computer tape, comprising a non-magnetic support and a magnetic recording layer coated thereon in which a ferromagnetic powder is dispersed, the feature consists in that the binder contains a polyisocyanate and at least one isocyanate reaction accelerating compound selected from the group consisting of (1) tertiary amine compounds, (2) tin compounds, (3) organometallic compounds except tin compounds, (4) amphoteric ion compounds and (5) organic acids. The stability and abrasion resistance are largely improved.

2 Claims, No Drawings

MAGNETIC RECORDING MEDIUM

This application is a continuation of application Ser. No. 592,981 filed 3/23/84 now abandoned.

BACKGROUND OF THE INVENTION

1. Field of the Invention

This invention relates to a magnetic recording medium such as video tape, audio tape or computer tape and more particularly, it is concerned with a magnetic recording medium having an improved abrasion resistance.

2. Description of the Prior Art

In a magnetic recording medium which has commonly been used at present, a ferromagnetic powder is dispersed in a binder of thermoplastic resin such as vinyl chloride-vinyl acetate resins, vinyl chloride-vinylidene chloride resins, cellulose resins, acetal resins, urethane resins, acrylonitrile-butadiene resins and the like, individually or in combination, and coated onto a support member such as polyethylene terephthalate, cellulose triacetate, polyvinyl chloride and the like to form a magnetic layer. This magnetic layer has a drawback that the abrasion resistance is inferior so that a running path of a magnetic tape is contaminated.

For the purpose of forming a binder layer excellent in abrasion resistance, it has hitherto been proposed to use thermosetting resins such as melamine resin, urea resin and the like, or to add binders capable of bridge making through chemical reactions, such as isocyanate compounds, epoxy compounds and the like to the above described thermoplastic resins. However, even if such bridge making binders are added, a long time has been taken until the finish of the reaction.

SUMMARY OF THE INVENTION

It is an object of the present invention to provide a magnetic recording medium having stable properties, for example, excellent abrasion resistance given in a very short time after coating a magnetic coating composition.

It is another object of the present invention to provide a magnetic recording medium excellent in orientation for high density magnetic recording.

These objects can be attained by a magnetic recording medium comprising a non-magnetic support and a magnetic recording layer coated thereon in which a ferromagnetic powder is dispersed in a binder, characterized in that the binder contains a polyisocyanate and at least one isocyanate reaction accelerating compound selected from the group consisting of (1) tertiary amine compounds, (2) tin compounds, (3) organic metal compounds except tin compounds, (4) amphoteric ion compounds and (5) organic acids.

DETAILED DESCRIPTION OF THE INVENTION

The inventors have made various studies on the binder systems comprising vinyl chloride copolymers and/or nitrocellulose as a main component for dispersion jointly with polyurethanes and polyisocyanates and consequently, have found that hardening of polyisocyanates is accelerated by adding some compounds and utilizing this phenomenon, a a stable magnetic recording medium having a high abrasion resistance can be produced in a very short time.

Examples of the reaction of polyisocyanates in magnetic layers are urea-forming reaction of isocyanate group and water, biuret-forming reaction of the thus formed urea linkage with isocyanate group, urethane-forming reaction of isocyanate group and hydroxyl group in another binder than the polyisocyanates, allophanate-forming reaction of the urethane linkage with isocyanate group, amide-forming reaction of isocyanate group and carboxyl group in another binder than the polyisocyanates and acyl urea forming reaction of the amide with isocyanate group. Hardening of a magnetic layer proceeds by these reactions.

In the present invention, at least one of the following compounds for accelerating the isocyanate reactions is added to a binder in a proportion of 0.1 to 40% by weight, preferably 1 to 20% by weight to the polyisocyanate in the binder.

As the compound for accelerating the isocyanate reactions, there is used at least one member selected from the group consisting of (1) tertiary amine compounds, (2) tin compounds, (3) organic metal compounds except tin compounds, (4) amphoteric ion compounds and (5) organic acids. Examples of these compounds are as follows:

(1) Tertiary Amine Compounds

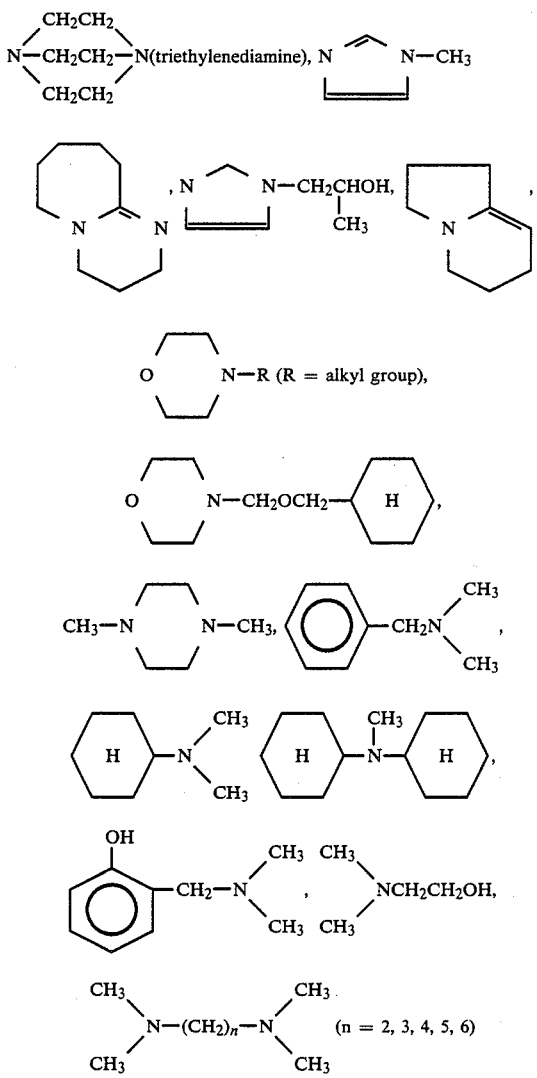

-continued

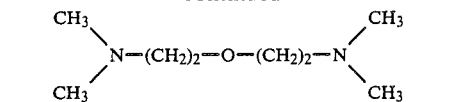

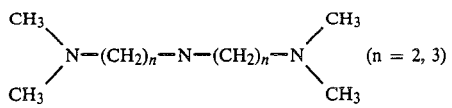 (n = 2, 3)

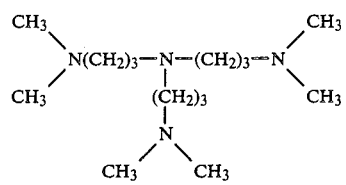

Salts of these amines with organic acids, for example, carboxylic acids such as formic acid, phenol, p-toluenesulfonic acid and the like; and inorganic acids such as hydrochloric acid, carbonic acid and the like. The proceed of the hardening reaction can be controlled by choice of the salt, as described hereinafter. Of the tertiary amines, in particular, triethylenediamine is preferable.

(2) Tin Compounds

Organotin compounds represented by the general formula

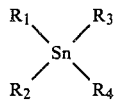

in which $R_1$ to $R_4$ are alkyl groups, halogens, alkoxy groups and $R_5COO-$ wherein $R_5$ is an alkyl, alkenyl, cyclohexyl, phenyl group or derivatives thereof, for example, dibutyltin diacetate, tributyltin acetate, dibutyltin dilaurate, tributyltin laurate, tin octoate, tin oleate, monoethyltin trichloride, monobutyltin trichloride, dimethyltin dichloride, dibutyltin dichloride, triethyltin chloride, tetrabutyltin, dibutyldimethoxytin; organotin compounds represented by the general formula

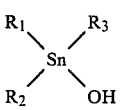

in which $R_1$ to $R_3$ are alkyl groups and phenyl group, for example, trimethyltin hydroxide and triphenyltin hydroxide; organotin compounds represented by the general formula

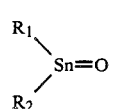

in which $R_1$ and $R_2$ are alkyl groups, for example, Octyl$_2$SnO; organotin compounds represented by the general formula

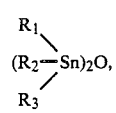

in which $R_1$ to $R_3$ are alkyl groups, for example, (Butyl$_3$Sn)$_2$O; and inorganic tin compounds such as stannous chloride and stannic chloride.

(3) Organometallic Compounds except tin compounds

Organic acid salts of Ti, V, Cr, Mn, Fe, Co, Ni, Cu, Zn, B, Pb, Zr, Se, Mo, Mg and Be, for example, lead naphthenate, zirconium naphthenate, cobalt naphthenate, zinc octoate and lead acetate; acetylacetonates of the above described metals, represented by the general formula $M^n(acac)_n$, for example, $M^{II}(acac)_2$ wherein $M^{II}$ is Cu, Be, Mg, Zn, Pb, VO, Mo, MoO$_2$, Co and Ni, $M^{III}(acac)_3$ wherein $M^{III}$ is Se, Ti, V, Cr, Mn, Fe and Co, and $M^{IV}(acac)_4$ wherein $M^{IV}$ is V and Zr; and alkoxy compounds of the above described metals, for example, Ti(OButyl)$_4$, VO(OButyl)$_3$, Zr(OButyl)$_4$, Zn(OButyl)$_4$ and BF$_3$(OC$_2$H$_5$)$_2$.

(4) Amphoteric Ion Compounds

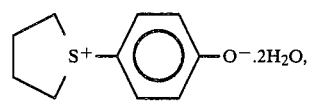

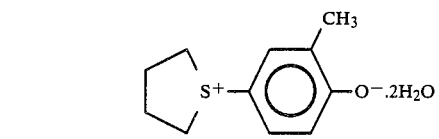

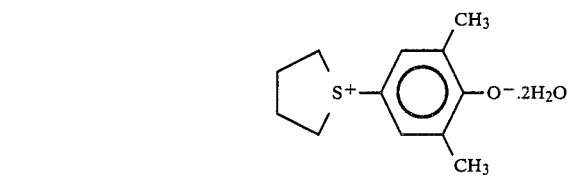

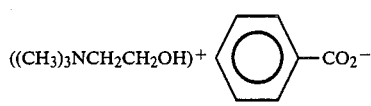

and various amino acids, for example, glycine, alanine, valine, leucine, isoleucine, celin, threonine, cystine, cysteine, methionine, aspartic acid, glutamic acid, lysine, arginine, phenylalanine, tyrosine, histidine, tryptophan, proline and oxyproline.

(5) Organic Acids

Aromatic and aliphatic carboxylic acids, for example,

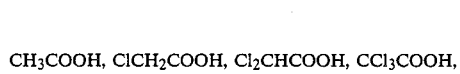

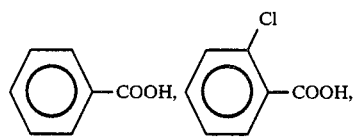

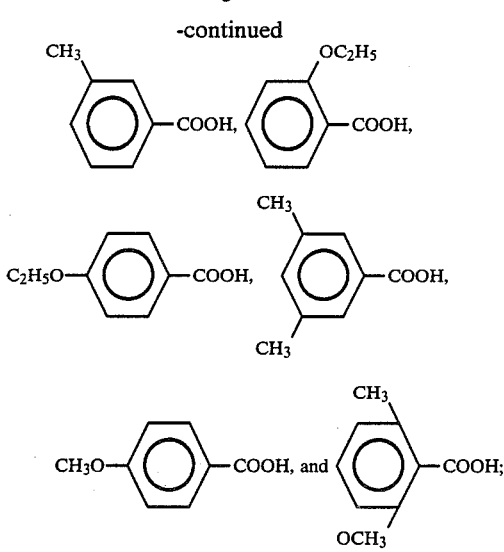

phenols, for example

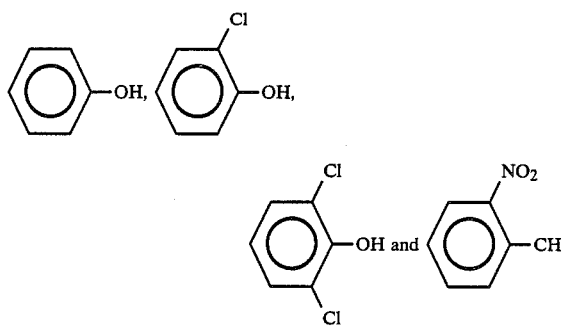

As the polyisocyanate, there can be used any of ordinary polyisocyanates such as tolylene diisocyanate, diphenyl-methane diisocyanate, naphthalene diisocyanate, hexamethylene diisocyanate, triphenylmethane triisocyanate and adducts thereof (e.g., Colonate L—commercial name—manufactured by Nippon Polyurethane Kogyo KK). The polyisocyanate is generally used in a proportion of 10 to 150% by weight to the binder.

When the compound for accelerating the isocyanate reactions is added, on the other hand, there arise problems that the storage stbility of a resin solution in which a magnetic substance is dispersed is deteriorated and the pot life is short. To meet the situation, for example, the following measures (1), (2) and (3) can be taken:

(1) The accelerating compound is added to a magnetic coating composition just before coating.

(2) A tertiary amine is added to a magnetic coating composition in the form of a salt and after coating and taking up, the hardening reaction is allowed to proceed by releasing or dissociating the salt at a high temperature, e.g. 40° to 100° C. After orientation, the coated film can rapidly be passed through a zone at an elevated temperature and can be set with holding the orientation.

(3) A liquid containing the accelerating compound is applied to a magnetic layer by coating, immersing or spraying.

In a step after coating a magnetic coating composition, the coated film in the form of a roll can be subjected to a heat treatment or subjected to control of the water content before or after supercalendering. After coating a magnetic layer, the coated film can be subjected to drying and immediately to calendering. However, the present invention is not intended to be limited to these procedures. Addition of the above described accelerating compounds can be carried out not only to magnetic layers but also to back layers or overcoated layers in which hardening reactions of polyisocyanates are carried out.

The magnetic recording medium of the present invention is particularly effective in the binder system comprising vinyl chloride copolymers and/or nitrocellulose, as a predominant binder for dispersion, mixed with polyurethanes and polyisocyanates. However, the present invention is not limited to this binder system, but methods of preparing the raw materials and coating compositions, coating methods, calendering methods and slitting methods can be carried out in known manner (Japanese Patent Publication Nos. 22073/1972 and 9841/1978, and Japanese Patent Application OPI (Kokai) Nos. 43405/1977, 142756/1977, 133521/1982, 135439/1982 and 98719/1981).

As the predominant binder for dispersion of the present invention, there can be used, in addition to vinyl chloride copolymers (e.g. VAGH, VMCH and VYHH—commercial name—manufactured by UCC) and/or nitrocellulose, vinyl chloride-vinylidene chloride copolymers, vinylidene chloride-acrylonitrile copolymers, cellulose acetate butyrate, cellulose propionate, polyesters and the like.

The present invention will be explained in detail with reference to the following examples. It will be obvious to one skill in the art that various changes and modifications can be made in components, ratios, operational order and the like without departing from the spirit of the present invention. Therefore, the present invention should not be construed as being limited to the following examples. All parts, percents, ratios and the like are to be taken as by weight unless otherwise indicated.

EXAMPLE

A magnetic recording tape was prepared using the following composition:

| | |
|---|---|
| Co-doped $\gamma$-$Fe_2O_3$ Hc 630 Oe (mean particle size: 0.33 $\mu$m) | 300 parts |
| Vinyl Chloride/Vinyl Acetate/Maleic Acid (82/13/5%; polymerization degree 430) | 33 parts |
| Polyurethane Resin (molecular weight: 47,000 synthesized from butylene adipate and tolylene diisocyanate) | 23 parts |
| Carbon Black (electrically conductive carbon black, mean particle diameter: 30 m$\mu$) | 18 parts |
| $Al_2O_3$ as abrasives (mean particle diameter 0.2 $\mu$m) | 7 parts |
| Myristic Acid/Oleic Acid (3/1 weight ratio) | 7 parts |
| Amyl Stearate | 1 parts |
| MEK/Butyl Acetate as solvents (3/7 weight ratio) | 780 parts |

The above described composition was well blended and dispersed by means of a ball mill and sand mill to prepare a magnetic coating composition.

Then, 16 parts as solid of a reaction product of a mol of trimethylolpropane and 3 mols of toluene diisocyanate as a low molecular weight polyisocyanate component (Colonate L—commercial name—manufactured by Nippon Polyurethane KK) was added thereto.

Just before coating the above described coating composition, the following isocyanate reaction accelerating compositions Nos. 1-20 were respectively added to prepare finish compositions:

No. 1
  Sample for control to which no accelerating compound is added.
Nos. 2 to 10
  0.016, 0.032, 0.16, 0.32, 0.80, 1.60, 3.20, 6.40 and 9.60 parts of triethylenediamine were respectively added (corresponding to 0.1, 0.2, 1, 2, 5, 10, 20, 40 and 60 parts of triethylenediamine to 100 parts of Colonate L solid component).
Nos. 11 to 19
  5 parts of the following compounds were respectively added to 100 parts of Colonate L solid component:
  No. 11 Dibutyltin Dilaurate
  No. 12 Stannic Chloride
  No. 13 Cobalt Naphthenate

TABLE 1

| Sample No. | Accelerating compound | Amount (to 100 parts of Colonate L solid component) | Chroma S/N (dB) | Time (hr) required when residual NCO is less than 10% based on 100% just after coating | Time (hr) held at 40° C. to give still life of at least 30 min. |
|---|---|---|---|---|---|
| 1 | — | 0 | ±0 | 170 | 120 |
| 2 | Triethylenediamine | 0.1 | ±0 | 160 | 110 |
| 3 | Triethylenediamine | 0.2 | +0.1 | 140 | 100 |
| 4 | Triethylenediamine | 1 | +0.1 | 40 | 30 |
| 5 | Triethylenediamine | 2 | +0.1 | 25 | 24 |
| 6 | Triethylenediamine | 5 | −0.1 | 22 | 20 |
| 7 | Triethylenediamine | 10 | −0.1 | 14 | 12 |
| 8 | Triethylenediamine | 20 | −0.3 | 10 | 8 |
| 9 | Triethylenediamine | 40 | −0.4 | 7 | 5 |
| 10 | Triethylenediamine | 60 | −0.8 | 3 | 4 |
| 11 | Dibutyltin Dilaurate | 5 | +0.1 | 25 | 23 |
| 12 | Stannic Chloride | 5 | −0.1 | 120 | 100 |
| 13 | Cobalt Naphthenate | 5 | −0.1 | 43 | 40 |
| 14 | Ferrous Acetylacetonate | 5 | +0.1 | 85 | 70 |
| 15 | N—methylmorpholine | 5 | +0 | 32 | 30 |
| 16 | 2-Methylbenzoic | 5 | +0.1 | 110 | 90 |
| 17 | CH$_2$ClCOOH | 5 | −0.1 | 100 | 80 |
| 18 | 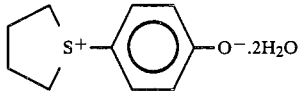 | 5 | −0.1 | 43 | 40 |
| 19 | Glutamic Acid | 5 | +0.1 | 70 | 60 |
| 20 | Triethylenediamine (2.5) + Dibutyltin Dilaurate (2.5) | 5 | +0.1 | 24 | 22 |

No. 14 Ferrous Acetylacetonate
No. 15 N-Methylmorpholine
No. 16 2-Methylbenzoic Acid
No. 17 CH$_2$ClCOOH
No. 18

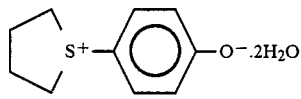

No. 19 Glutamic Acid
No. 20
  2.5 parts of triethylenediamine and 2.5 parts of dibutyltin dilaurate were added to 100 parts of Colonate L solid component These coating compositions were respectively coated onto a polyethylene terephthalate base of 15 μm in thickness, undercoated with a polyester type polymer, to give a coating thickness of 5 μm on dry basis, dried and then subjected to a supercalendering treatment at a rate of 100 m/min. The resulting samples taken up round a roll were held at 40° C. to advance the reaction sufficiently.

The results of comparing the properties of these samples are shown in Table 1. The proceed of the hardening reaction is examined by measuring the residual NCO quantity using a Fourier Transform Infrared Spectrophotometer JIR-40 made by Nippon Denshi KK and this is represented by a relative value when the data of Sample No. 1 is 100 just after coating. Chroma S/N is an S/N of video color signal represented by a relative value when the data of Sample No. 1 is ±0 dB as standard measuring by means of a VTR of NV-8200 type made by Matsushita Denkisangyo KK. The reaction rate of these sample tapes is obtained by charging a sample tape in a VHS half, subjecting to reproduction of a still image using a VTR of NV-8200 type made by Matsushita Denkisangyo KK and measuring the time required for a still life of at least 30 minutes:

As is evident from Table 1, even if the isocyanate reaction accelerating compounds are added, Chroma S/N is not always lowered and in particular, deterioration of the characteristics hardly takes place, i.e. Chroma S/N being in the range of ±0.1 dB, when the amounts of the accelerating compounds added are up to 5 parts. However, if the amount of the accelerating compound is increased, Chroma S/N tends to be lowered as shown by −0.3 dB of Sample No. 8, −0.4 dB of Sample No. 9 and −0.8 dB of Sample No. 10. Furthermore, by the addition of the accelerating compounds, the time required when the residual quantity of NCO is less than 10% is very short and accordingly, the time when a sample is held at 40° C. to give a still life of at least 30 minutes is remarkably shortened.

What is claimed is:

1. A magnetic recording medium comprising a nonmagnetic support and a magnetic recording layer coated thereon in which a ferromagnetic powder is dispersed in a binder, which is a binder system comprising at least one member selected from the group consisting of vinyl chloride copolymers and nitrocellulose as a predominate binder component mixed with a polyisocyanate in a proportion of 10 to 150 wt % to the binder and at least one isocyanate rection accelerating compound in a proportion of from 0.1 to 20 wt % to the isocyanate in the binder, said component selected from cthe group consisting of stannic chloride, cobalt naphthenate, ferrous acetylacetonate, 2-methylbenzoic acid, monochloroacetic acid, glutamic acid and,

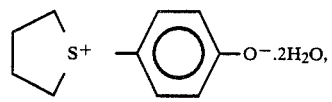

and added just before coating the non-magnetic support with the magnetic recording layer.

2. The magnetic recording medium of claim 1, wherein the isocyanate reaction accelerating compound is added by subjecting the magnetic recording layer to coating, immersing or spraying with a solution containing the same.

* * * * *